United States Patent Office 3,796,762
Patented Mar. 12, 1974

3,796,762
LOW MOLECULAR WEIGHT DIENE POLYMERS USING AQUEOUS HYDROGEN PEROXIDE AND CYCLOHEXANOL(ONE) MEDIUM
Joseph A. Verdol, White Plains, N.Y., and Patrick W. Ryan, Glen Mills, Pa., assignors to Atlantic Richfield Company, New York, N.Y.
No Drawing. Filed Apr. 5, 1971, Ser. No. 131,491
Int. Cl. C07c 33/02, 33/06; C08g 22/04
U.S. Cl. 260—635 R                    10 Claims

ABSTRACT OF THE DISCLOSURE

There is disclosed a process for polymerizing conjugated diene monomers to form relatively low molecular weight polymers. The reaction can be conducted at temperatures of above 100° C. to about 200° C. in the presence of a hydrogen peroxide catalyst and a reaction medium which is an essentially water-insoluble, alicyclic, monocyclic alcohol or ketone having at least six carbon atoms in a carbocyclic ring. The reaction system has at least two liquid phases formed by the monomer, catalyst and reaction medium. Cyclohexanol is a preferred reaction medium.

---

This invention relates to a method of preparing hydroxyl-containing, relatively low molecular weight polymers from conjugated dienes. More specifically, the invention concerns the manufacture of such hydroxyl-containing polymers by hydrogen peroxide catalysis in a plural liquid phase reaction system containing an essentially water-insoluble, alicyclic alcohol or ketone or a mixture thereof as a reaction medium. The polymeric products made in this reaction system are especially suitable for the preparation of polyurethanes by reaction of the hydroxyl-containing polymers with diisocyanates.

In making polyurethanes, diisocyanates can be reacted with a variety of polyhydroxyl-containing materials such as glycols, triols, hydroxyl-terminated polyesters and other polyols. Among the polyols used have been the hydroxyl-containing polymers of conjugated dienes such as butadiene, and these polyols include diols or long chain glycols, although special advantages accrue if the polyols contain on the basis of the average molecule at least 2.1 hydroxyl groups.

There are a number of patents which disclose hydroxyl-containing polymers of conjugated dienes, for instance, see U.S. Pats. Nos. 2,877,212; 3,055,952; and 3,338,861. British Pat. No. 957,788 describes the preparation of polymers from dienes by hydrogen peroxide catalysis in a single phase reaction system. Although the British patent does not state that the polymer products contain hydroxyl groups such is the case, see U.S. Pat. No. 3,427,366. The latter patent also discloses that in the polymers prepared by hydrogen peroxide catalysis the diene monomer is incorporated primarily by 1,4-type polymerization, as distinguished from 1,2-polymerization. The 1,2-type polymers have the major portion of their unsaturation in side chains, rather than in the main carbon chain as exhibited by polymers formed to a major extent by 1,4-polymerization. U.S. Pat. No. 2,877,212 also discloses hydroxyl-containing polymers formed by 1,4-polymerization of the diene.

The present invention is directed to a process for making hydroxyl-containing polymers from conjugated, diolefinically unsaturated monomers by employing a reaction system containing the monomer, hydrogen peroxide catalyst and an essentially water-insoluble, alicyclic alcohol or ketone reaction medium to provide a system in which these components are present in plural liquid phases. The process is advantageous in that it affords good yields of polymers having highly satisfactory characteristics, and yet such results can be reached without the necessity of forming a single phase reaction system. The products are low molecular weight, normally liquid polymers having terminal, reactive hydroxyl groups which polymers can be chain extended and converted into useful elastomers.

Aside from the monomer component and hydrogen peroxide catalyst, the reaction system of this invention contains a significant amount of an essentially water-insoluble, alicyclic, monocyclic, alcohol or ketone having at least 6 carbon atoms in a carbocyclic ring. These alicyclic materials are saturated and are essentially composed of carbon and hydrogen, except for the single oxygen atom in the hydroxyl or keto group, and generally exhibit a water-solubility of less than 10, preferably less than 5, grams in 100 milliliters of water at 20° C. The alicyclic ketone or alcohol forms a liquid reaction medium in which the polymerization of this invention takes place and thus is liquid at least at the reaction temperature. This reaction is effected even though the hydrogen peroxide catalyst has little solubility in the alicyclic alcohol or ketone, and the fact that the alicyclic ketone or alcohol is essentially water-insoluble facilitates its separation from the reaction mixture. Also it is surprising to find that the polymer product is of relatively low molecular weight, since plural liquid phase diene polymerization systems using hydrogen peroxide catalysis have been indicated to make high molecular weight polymers. Particular examples of such reaction media which often have 6 to about 12 carbon atoms, are cyclohexanone, cycloheptanol, cyclooctanol, cyclohexanol and similar materials in which the hydroxyl group or keto oxygen atom is attached directly to a carbon atom in the carbocyclic ring. Mixtures of these reaction media may also be used, and a preferred reaction medium is cyclohexanol.

In the method of the present invention the alicyclic alcohol or ketone reaction medium is present in an amount sufficient to provide the desired extent of polymerization or conversion of the monomers in an acceptable reaction time. Often the alicyclic alcohol or ketone reaction medium is at least about 5 or 10 weight percent of the total monomers present at the beginning of polymerization, preferably about 25 to 100 weight percent or about 35 to 70 weight percent. The use of excessively large amounts of the alicyclic alcohol or ketone reaction medium can be economically unattractive and may lead to unnecessary expense in terms of increased size of the reactor, product separation facilities and other equipment. There seems little reason to use greater than about 200 weight percent of the alicyclic alcohol or ketone reaction medium based on the total initial monomer.

The catalyst employed in the polymerization system of the present invention is hydrogen peroxide. Although anhydrous hydrogen peroxide can be used special precautions may be necessary to avoid explosions. It is preferred, therefore, to add and employ the catalyst as an aqueous solution of hydrogen peroxide, for instance, containing at least about 10% water. Generally, such solutions contain about 25–75 weight percent hydrogen peroxide and approximately 50% solutions are preferred for use in the present invention. The amount of catalyst in the reaction system is sufficient to afford the desired catalytic effect in terms of polymer yield, reaction time and polymer properties. Often the amount of hydrogen peroxide is at least about 0.5 weight percent based on the total monomer component. Generally, the amount of hydrogen peroxide employed does not significantly exceed about 30 weight percent based on the monomer, and preferably the amount is about 1 to 10%. These amounts of hydrogen peroxides are stated on a non-aqueous or anhydrous basis at the initiation of polymerization.

The polymerization of the present invention is conducted at temperatures above 100° C. and preferably at at least about 105° C. Generally, the reaction temperature does not materially exceed about 200° C., and temperatures in the range of about 110–150° C. are preferred. The reaction temperature, pressure, monomer, catalyst and reaction medium are such that the reaction is essentially in the liquid phase with there being at least two liquid phases during the greater portion of the polymerization period, and there is one or more of the monomer, catalyst or alcohol or ketone reaction medium in each of such phases. There are generally present a monomer-alicyclic alcohol or ketone reaction medium phase and a catalyst phase. The product polymer may be soluble in the monomer-alicyclic alcohol or ketone phase.

To have adequate contact between the plural liquid phases during the polymerization of this invention, they are maintained in admixture as by agitation. There is no necessity that the agitation be particularly severe and it may only serve to form an unstable dispersion or mixture of the liquid phases during the reaction. In any event there is sufficient contact between the catalyst, monomer and alicyclic alcohol or ketone reaction medium to promote the desired polymerization. Preferably the reaction system is not a stable emulsion, and upon standing, distinct liquid phases separate with the catalyst being for the most part in the lower phase at ambient temperature. Water, if present in the reaction system, will usually be in the catalyst phase since water has low solubility in the alicyclic alcohol or ketone reaction medium and diene monomer.

In order to obtain relatively low molecular weight polymers, the reaction of the method of this invention is conducted essentially in the absence of molecular oxygen and thus excludes the use of significant amounts of materials which will produce molecular oxygen from the hydrogen peroxide or any other component present. Accordingly, the reaction is conducted in the essential absence of, for instance, heavy metal salts such as those of iron.

The hydroxyl groups of the polymers made by the process of this invention are usually predominantly in allylic, terminal positions on the main hydrocarbon chain of the polymers. A smaller number of the hydroxy groups may be substituted internally along the main hydrocarbon chain of the polymers, but even a majority of these hydroxyl groups seem to be in allylic positions and attached to the terminal carbon atoms of side chains of the polymers. Ordinarily, at least about 1.8 hydroxyl groups are present per polymer molecule on the average, and advantageously there are at least 2.1 to say 3 or more hydroxyls per polymer molecule, preferably 2.1 to 2.8. As noted above, the diene polymers have the majority of their unsaturation in the main hydrocarbon chain and a majority of the diene monomer is incorporated in the product by 1,4-type addition polymerization. Frequently the polymers may have about 40 to 70 percent trans-1,4-unsaturation and about 10 to 35% pendant 1,2-vinyl unsaturation, preferably about 15 to 25%.

The products made by the process of this invention will often have number average molecular weights of about 400 to 25,000, preferably about 900 to 10,000. The molecular weight can be determined, for example, by cryoscopic, ebullioscopic or osmometric methods. The viscosity of the polymers may be in the range of about 5 to 20,000 poises at 30° C., preferably about 15 to 5000 poises. The polymers may be characterized by a relatively narrow molecular weight distribution among the molecules. Also, the polymers often exhibit a substantial absence of molecules having molecular weights above the stated ranges.

The conjugated dienes which are employed to make the polymers include the diolefinically-unsaturated, unsubstituted, 2-substituted or 2,3-disubstituted 1,3-dienes of 4 up to about 12 carbon atoms. The diene is preferably aliphatic and has up to 6 carbon atoms and the substituents in the 2- and/or 3-position may be hydrogen, alkyl, generally lower alkyl, e.g. of 1–4 carbon atoms, aryl, halogen, especially chlorine, nitro, nitrile, etc. Typical dienes which may be employed are 1,3-butadiene, isoprene, chloroprene, 2-cyano - 1,3 - butadiene, 2,3 - dimethyl-1,3-butadiene, etc. The diene is about 25 to 100 weight percent of the monomer employed in the reaction of this invention, preferably at least about 50%.

Mono-olefinically-unsaturated monomers may be incorporated in the polymer products made in this invention and these monomers may be components which provide cross-linking sites. Usable monomers include alpha-mono-olefinic materials of about 2 or 3 to 10 or 12 carbon atoms such as styrene, vinyl toluene, methyl methacrylate, methylacrylate, acrylic esters, vinyl chloride, vinylidene chloride, etc. Acrylonitrile, acrylic acid, vinylidene cyanide, acrylamide, etc., provide low-molecular weight, hydroxy-terminated diene intermediate copolymers which have sites suitable for cross-linking. As can be seen, the usable olefinic monomers include those which may be considered to be ethylenes, substituted with halogen, hydrocarbon, cyano, carboxyl or amido-containing radicals. Preferably the monomer is essentially water-insoluble. The choice and amount of monoolefinic monomer employed will often be determined on the basis of properties desired in the polymer. Generally the amount of mono-olefinic monomer in the polymer will be about 0–75% by weight of the total addition polymer, preferably about 1 to 50%, or even about 10–40%, with the diene being the essential balance of the monomer.

In addition to the homopolymers and copolymers comprised of single dienes and single mono-olefinic monomers, the present invention may also prepare polymers from combinations of a plurality of dienes and mono-olefinic monomers. For example, mixtures of butadiene, isoprene and styrene can be polymerized to afford low molecular weight, hydroxyl-containing interpolymers. Various combinations of dienes and mono-olefinic monomers may be copolymerized to produce hydroxyl-containing copolymers or interpolymers which may be used to form elastomers.

Typically the process of the present invention can be exemplified by charging at room temperature to a stirred reactor, 55.6 parts by weight of butadiene-1,3, 38.8 parts by weight of cyclohexanol, and 5.6 parts by weight of 50% aqueous hydrogen peroxide. The reactor was filled with nitrogen and the reactor contained two liquid phases, the upper phase being essentially butadiene and cyclohexanol and the lower phase being essentially the 50% $H_2O_2$. The contents of the reactor were heated to 118° C. in 35 minutes under agitation to mix the separate liquid phases, and held for 2 hours at this temperature to complete the polymerization reaction with about 63% conversion of the butadiene and 91% $H_2O_2$ consumption. The maximum pressure during the polymerization was 305 p.s.i.g. The reactor contents were cooled to 66° C. in 35 minutes and the reaction mixture withdrawn from the reactor. The polymer was in solution in the reaction mixture which at 27° C. was milky. A distinct polymer phase was formed from the reaction mixture by combining the latter at 66° C. with distilled water in an amount of about 80% based on the reaction mixture. The upper polymer-containing phase was separated from the lower aqueous phase by decanting, and the polymer phase was again mixed at 66° C. with the same amount of distilled water as used in the first wash or polymer phase separation procedure. The polymer was dried at 104 to 106° C. and 2 mm. Hg vacuum. The liquid polymer product had a viscosity of somewhat above 40 poises at 30° C. and a hydroxyl value of 0.92 milliequivalent per gram which on an average of 2.3 hydroxyl groups per molecule indicates a molecular weight of about 2500.

The desired polymerization can also be obtained by substituting for the cyclohexanol in the foregoing procedure a like amount of cyclohexanone. Alternatively, one may use as the reaction medium a mixture of cyclohexanol and cyclohexanone by, for instance, replacing the cyclohexanol with the same amount of a 90% cyclohexanol-10% cyclohexanone mixture. Also in these various reaction systems one may use as the monomer, for example, a 75/25 weight percent mixture of butadiene and either styrene or acrylonitrile and obtain the desired polymer product. Aside from these specific embodiments the invention may be practiced in other ways with various monomers as aforesaid.

What is claimed is:

1. A method for producing a polymer having a number average molecular weight of about 400 to 25,000 and at least about 1.8 predominantly allylic, terminal hydroxyl groups per average molecule which comprises polymerizing in an admixed, plural liquid phase reaction system, monomer having about 25 to 100% by weight of an addition-polymerizable, 1,3-conjugated, diolefinically-unsaturated monomer selected from the group consisting of 1,3-butadiene, isoprene, chloroprene, 2-cyano-1,3-butadiene, and 2,3-dimethyl-1,3-butadiene, and about 0 to 75% by weight of an addition polymerizable, alpha-olefinic monomer selected from the group consisting of styrene, vinyl toluene, methyl methacrylate, methyl acrylate, vinyl chloride, vinylidene chloride, acrylonitrile, acrylic acid, vinylidene cyanide, and acrylamide, at above 100° C. to about 200° C., and in the presence of about 0.5 to about 30 weight percent based on the monomer of hydrogen peroxide catalyst on an anhydrous basis, said hydrogen peroxide catalyst being in aqueous solution containing about 25 to 75 weight percent hydrogen peroxide, and about 5 to 200 weight percent based on the monomer of a liquid reaction medium for said polymerization consisting essentially of cyclohexanol or cyclohexanone or mixtures thereof, said monomer, hydrogen peroxide catalyst and reaction medium providing a plurality of liquid phases during said polymerization, and said polymerization being conducted in the essential absence of molecular oxygen.

2. The method of claim 1 in which the reaction temperature is about 110 to 150° C.

3. The method of claim 1 in which said diolefinically-unsaturated monomer is at least about 50% of the total monomer.

4. The method of claim 3 in which the diolefinically-unsaturated monomer is butadiene-1,3.

5. The method of claim 1 in which said reaction medium is cyclohexanol.

6. The method of claim 2 in which the reaction medium is about 25 to 100 weight percent and the hydrogen peroxide is about 1 to 10 weight percent of the monomer present at the initiation of polymerization.

7. The method of claim 2 in which said diolefinically-unsaturated monomer is at least about 50% of said monomer.

8. The method of claim 7 in which said reaction medium is cyclohexanol.

9. The method of claim 8 in which said diolefinically-unsaturated monomer is butadiene-1,3.

10. The method of claim 7 in which said diolefinically-unsaturated monomer is butadiene-1,3.

References Cited

UNITED STATES PATENTS

| 3,392,118 | 7/1968 | Isaacson et al. | 260—94.2 R |
| 2,757,210 | 7/1956 | Jenner | 260—635 R |
| 2,333,633 | 11/1943 | Britton et al. | 260—Dig. 28 |
| 2,470,065 | 5/1949 | Barnes | 260—94.2 R |
| 2,310,961 | 2/1943 | Krope | 260—Dig. 28 |

FOREIGN PATENTS

| 957,788 | 5/1964 | Great Britain | 260—635 R |

JOSEPH E. EVANS, Primary Examiner

U.S. Cl. X.R.

260—77.5 AT, 82.3, 83.5, 83.7, 86.3, 87.5 C, 87.7, 88.2 C, 88.2 E, 92.3, 94.2 R, 465.4, 465.6, 485 R, 485 H, 561 B, 618 R, 633, Dig. 28